(12) United States Patent
Mirsky et al.

(10) Patent No.: US 11,558,947 B2
(45) Date of Patent: Jan. 17, 2023

(54) OUTDOOR LIGHTING SYSTEM AND METHOD

(71) Applicant: BRIGHT LED LTD, Haifa (IL)

(72) Inventors: Rami Mirsky, Haifa (IL); Baruch Altman, Pardes Hana (IL)

(73) Assignee: BRIGHT LED LTD

( * ) Notice: Subject to any disclaimer, the term of this patent is extended or adjusted under 35 U.S.C. 154(b) by 5 days.

(21) Appl. No.: 16/603,249

(22) PCT Filed: Apr. 12, 2018

(86) PCT No.: PCT/IL2018/050418
§ 371 (c)(1),
(2) Date: Oct. 7, 2019

(87) PCT Pub. No.: WO2018/189744
PCT Pub. Date: Oct. 18, 2018

(65) Prior Publication Data
US 2020/0170093 A1    May 28, 2020

Related U.S. Application Data

(60) Provisional application No. 62/484,948, filed on Apr. 13, 2017.

(51) Int. Cl.
| H05B 47/19 | (2020.01) |
| F21S 8/08 | (2006.01) |
| H04B 10/50 | (2013.01) |
| H04L 67/10 | (2022.01) |
| F21V 29/76 | (2015.01) |
| F21Y 115/10 | (2016.01) |

(Continued)

(52) U.S. Cl.
CPC .............. *H05B 47/19* (2020.01); *F21S 8/085* (2013.01); *H04B 10/502* (2013.01); *H04L 67/10* (2013.01); *F21V 29/76* (2015.01); *F21W 2131/103* (2013.01); *F21Y 2115/10* (2016.08); *G16Y 10/00* (2020.01)

(58) Field of Classification Search
CPC ................ H05B 47/19; F21Y 2115/10; F21W 2131/103
See application file for complete search history.

(56) References Cited

U.S. PATENT DOCUMENTS

| 2015/0035437 A1 | 2/2015 | Panopoulos | |
| 2016/0286629 A1* | 9/2016 | Chen | F21V 5/045 |

OTHER PUBLICATIONS

International Search Report of Application No. PCT/IL2018/050418 dated Jun. 19, 2018.

* cited by examiner

*Primary Examiner* — Jany Richardson
(74) *Attorney, Agent, or Firm* — Dhiraj Jindal; Patent Yogi LLC

(57) ABSTRACT

An outdoor lighting system for illumination of an outdoor area, the system configured to provide dynamical control in the outdoor area, the system comprising: a plurality of luminaires configured in the outdoor area; a plurality of street devices connected with the plurality of luminaires; at least one remote processor; at least one secondary processor; a cloud to which the plurality of luminaires and the plurality of street devices are connected; and the at least one remote processor and the at least one secondary processor are connected to the cloud; wherein the plurality of luminaires and the plurality of street devices are controlled in a plurality of functional modes.

22 Claims, 7 Drawing Sheets

(51) Int. Cl.
*G16Y 10/00* (2020.01)
*F21W 131/103* (2006.01)

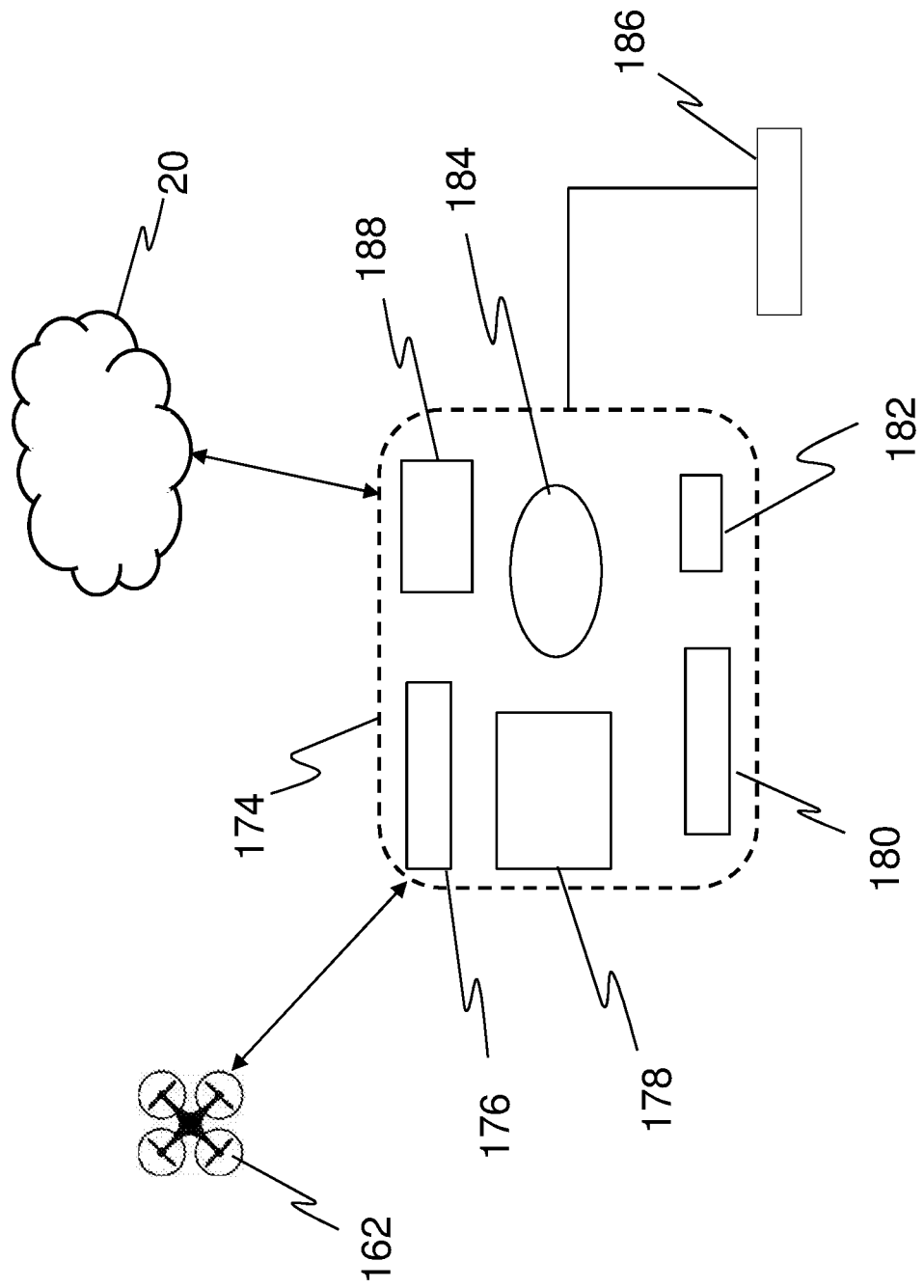

OUTDOOR LIGHTING SYSTEM AND METHOD

FIELD OF THE INVENTION AND BACKGROUND

The current invention relates to an outdoor lighting system and specifically to systems and devices used to illuminate streets, roads, parking lots, railways, and large outdoor areas. More specifically, embodiments of the current invention relate to lighting systems that provide both a lighting function and a processing platform having connectivity such as IP connectivity and connected elements.

In the specification and claims hereinbelow, the term "outdoor area" when used in conjunction with a lighting system is used interchangeably with "public space" and is intended to mean streets, roads, parking lots, railways, and any other extended outdoor area.

In recent years, several fields of advanced technologies made significant advances and gained large attention from global markets such as: LED lighting; IoT/IoE—Internet of Things/Internet of Everything; Smart City concepts and applications; and cellular, Wi-Fi and other wireless communications The following are definitions of terms used in the specification and claims which follow.

A "LED lamp" is a light-emitting diode (LED); a component assembled for use in lighting fixtures. The word "luminaire" is used in the specification and claims which follow to mean a lighting fixture, as known in the art, and specifically a lighting fixture having at least one LED lamp therein. The term "street light" and "street light" used in the specification and claims which follow is intended to mean a luminaire which is typically configured on an elevated platform, such as, but not limited to a typical lighting fixture pole.

LED lamps have a lifespan and electrical efficiency that is several times superior to that of incandescent lamps, and significantly better than most fluorescent and high intensity discharge (HID) lamps; with some LED devices capable of emitting over 100 lumens per Watt. The LED fixture market is projected to grow by more than twelve-fold over the next decade.

LED lighting is widely-applied for street lighting and many cities worldwide have been changing their street lighting systems to LED-based systems. The reason for this fast adoption of LED lighting by various municipalities is the dramatic energy savings of LED versus-conventional-lighting, which approaches about 60-70%.

"Internet of Things (IoT)" has been defined as a global infrastructure for the information society, enabling advanced services by interconnecting (physical and virtual) objects based on existing and evolving interoperable information and communication technologies. IoT is typically the network of physical objects (or "things") having electronics, software, sensors, and network connectivity embedded therein, enabling collection and exchange of data to and from the objects. IOT allows objects to be sensed and controlled remotely across existing network infrastructure creating opportunities for more direct integration between the physical world and computer-based systems, and resulting in improved efficiency, accuracy and economic benefit. Each object is uniquely identifiable through its embedded computing system, however the object is able to interoperate within the existing Internet infrastructure. Experts estimate that the IoT will consist of almost 50 billion objects by 2020.

"Things," as used with IoT, refers to a wide variety of devices such as, but not limited to: heart monitoring implants, biochip transponders on farm animals, electric clams in coastal waters, automobiles with built-in sensors, or field operation devices that assist firefighters in search and rescue operations. These devices collect useful data with the help of various existing technologies and then autonomously direct data between other devices. Examples of such things in the current market include, but are not limited to: smart thermostat systems and washer/dryers that use Wi-Fi for remote monitoring.

"Smart city" or "smarter city" are cities using digital technologies or information and communication technologies (ICT) to enhance quality and performance of urban services, to reduce costs and resource consumption, and to engage more effectively and actively with its citizens. Market sectors which have developed smart city technology include, but are not limited to: government services, transport and traffic management, energy, health care, water and waste services. Smart city applications are developed with the goal of improving the management of urban information flows and allowing for real time responses to challenges. A smart city may be more prepared to respond to an array of challenges, as opposed to one simple 'transactional' relationship with its citizens. Other terms that have used for similar concepts include "cyberville, "digital city", "electronic communities", "flexicity", "information city", "intelligent city", "knowledge-based city", "MESH city", "telecity", "teletopia", "Ubiquitous city", "wired city".

"Wireless communications" is intended to mean widespread means for connecting people, vehicles and elements in a cost-effective way. These means include, but are not limited to: cellular (e.g. 3G, 4G, 5G), Wi-Fi, LWPAN, V2X, V2V, V2I, 802.11p, DSRC, Zigbee, RF, UHF, VHF, MicroWave (MW), Li-Fi, Free Space Optics (FSO), SATCOM, any type of network topology—mesh, star, point-to-point, and any operator, technology, and protocol spectrum.

In some cases, the communication to at least some lamp posts is provided by fiber or similar wired connection and the term "connected", is intended to include both "wireless communication" and "wired communication" in this context.

Traditionally, streetlighting systems incorporating LED or other technologies, are used to illuminate roads and sidewalks. Usually streetlighting systems are used with a singular on/off option. Recently, with the introduction of LED technology, remote control and some dimming functionalities have been added. In parallel, cities, government agencies and various service providers have improved in and out-of-home services, municipality services, communication services or others, integrating multiple smart city systems, sensors, data, and logic, as well as private sources, commercial systems, end user use of the services and devices, and any other user or potential user of the public space. Such improvements and applications include autonomous vehicles, drones, smart billboards and other IoT devices and their respective service provider networks.

All of these functionalities must be performed securely, protecting user data and privacy, and in a timely fashion, integrating relevant data and systems in a timely and cost-effective fashion. In this environment, there is a plethora of sensor meters and other IoT devices, such as luminescence sensors, air quality sensors, parking sensors, motion sensors, climate sensors, humidity sensors, radiation sensors, speeding sensors, visual sensors, radar sensors, acoustic sensors, fire sensors, and others. Additionally, there are multiple applications, application providers, and service providers.

Some of the service providers are associated with single sensor/application, IoT, autonomous and communication devices, and some are not associated with any. This means that, for example, a weather-related information service provider installs its IoT sensors in the public space, usually collects the sensor data on its own network, or uses its communication devices and processors and processing environment being associated with his own sensors pays for communication, processing and maintenance. The service provider usually processes and uses its own data. This is done mostly in a central location such as the cloud. Such a reality presents many problems that impedes an evolution of the smart city and a coherent, optimal utilization of resources and wholesome services to public space users.

Additionally, it is challenging to introduce new sensors or other devices into the public area and, even more so, to introduce new applications that use such new and existing/deployed devices. Today there is typically virtually no sharing of resources, which results in high cost, low resource utilization, and a fragmented rather than a holistic approach and solutions for the public space. A holistic/integrated approach integrates data from multiple relevant sensors, whether being co-located or distributed, to integrate logic and decision-making by several different systems, vendors, providers and individuals, to share resources as much as possible including street processing power and communications, and to reduce communications and cost by data processing on streetlights or similar public-space installed processors connected on the network, integrating data and decisions at the street-level on the local processor. This approach enables improved decision locally, as well as reducing communication, latency and faults, costs and use of cloud processing resources. This allows multiple operators, vendors and applications providers to run their applications on a standard processor using standard tools for software development and software deployment such as the common Android OS, standard software languages, and App store paradigms to authenticate and deploy applications while sharing street-deployed sensors and platforms.

There is therefore a need to resolve such problems by allowing multiple processing devices to use one another's IoT and sensors; to share decisions and data and to coordinate their actions—all at the street or neighborhood local environment, rather than having to transmit all the information to some central cloud location and back to the field. Further, there is a need to allow using the streetlight in many ways besides a simple on/off/dimming street/road lighting. There is a need for a system to allow lighting to be responsive to various conditions and decisions according to multiple sensors, softwares, and applications, passer-by requirements/impacts, IoT devices, autonomous users of the public infrastructure, or others—either installed or associated with the same streetlight (such as Edge Computing) and/or with others, in a decentralized or centralized way as best fit to reduced latency, increase resource utilization, reduce costs and increase serviceability and forward compatibility with additional software or applications or IoT devices being introduced to the streetlight or to the public space. For example, solving the problems noted hereinabove may contribute to preventing road accidents with human-driven or autonomous vehicles by responding to changing conditions such as weather, fog, traffic, pedestrian movement, prediction of such being based in AI, or other parameters and either informing the vehicle or driver in-advance and/or dynamically adapting the lighting of a single or multiple streetlights or other sources of light or other waveforms or frequencies in coordination to better alert the road users to any specific hazard. It may improve the lighting conditions or other waveform illumination conditions to specific needs or autonomous vehicles sensors in different distances or directions or shading conditions or others. It may help protect assets in the streets. These are just a few examples currently not resolved and which could be addressed in a standard-based platform, App-store deployment, and management manner.

SUMMARY OF INVENTION

According to the teachings of the current invention, there is provided an outdoor lighting system for illumination of an outdoor area, the system configured to provide dynamical control in the outdoor area, the system comprising: a plurality of luminaires configured in the outdoor area; a plurality of street devices connected with the plurality of luminaires; at least one remote processor; at least one secondary processor; a cloud to which the plurality of luminaires and the plurality of street devices are connected; and the at least one remote processor and the at least one secondary processor are connected to the cloud; wherein the plurality of luminaires and the plurality of street devices are controlled in a plurality of functional modes.

Preferably, at least one of the plurality of luminaires is configured with elements comprising: a processor/computer configured to process lighting related functions of at least one lighting-related element; an App Engine connected to the processor/computer; power related elements connected to the process/computer and to the at least one lighting-related element; communication elements connected to the processor/computer and power related elements; and internal sensors connected to the processor/computer and to the at least one lighting-related element, wherein the luminaire is configured to interact with external communications elements; electromechanical drone-related elements; and external sensors and associated devices.

LIST OF FIGURES

The invention is herein described, by way of example only, with reference to the accompanying drawings, wherein.

Figure 5:
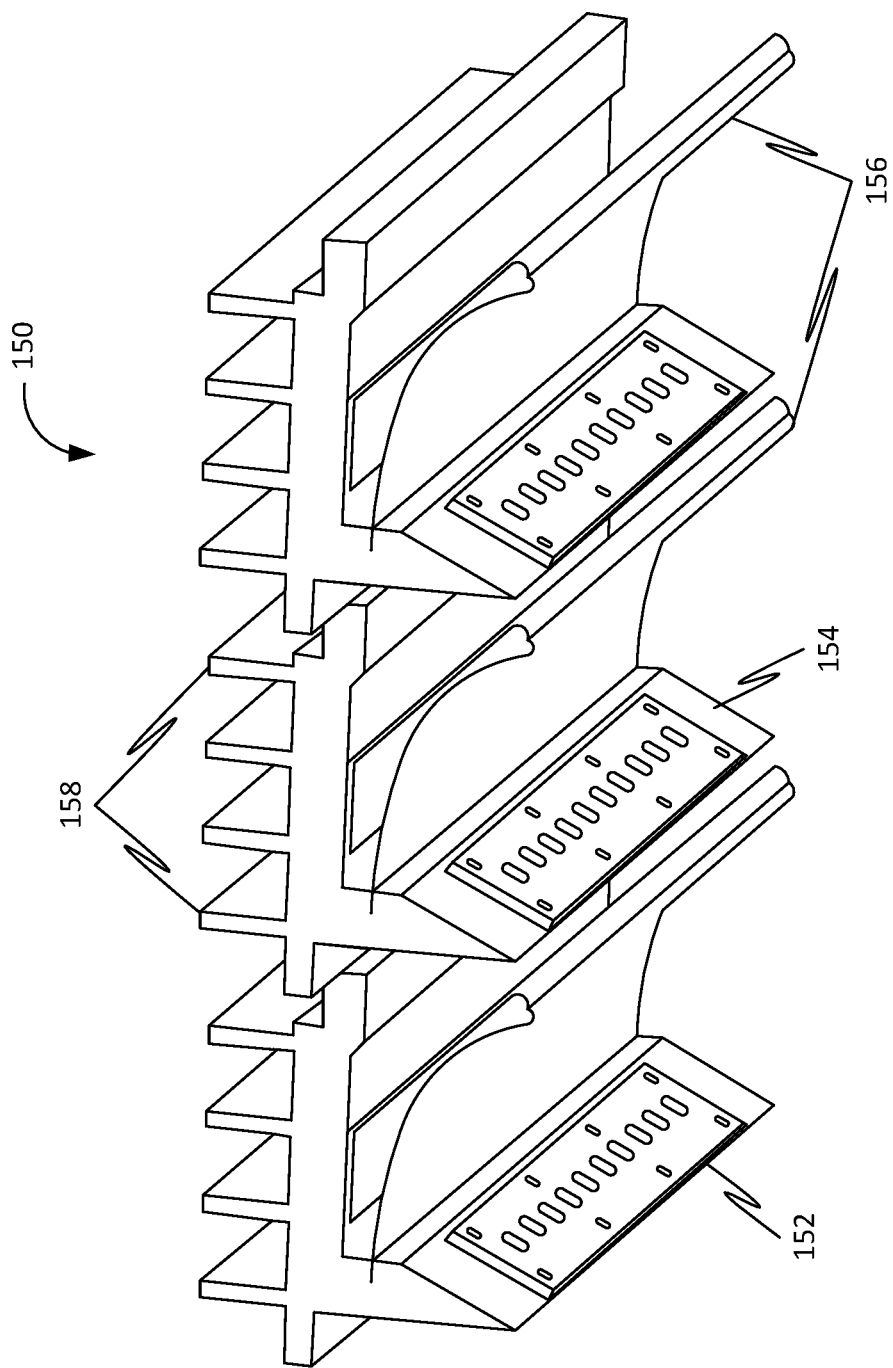
Figure 6:
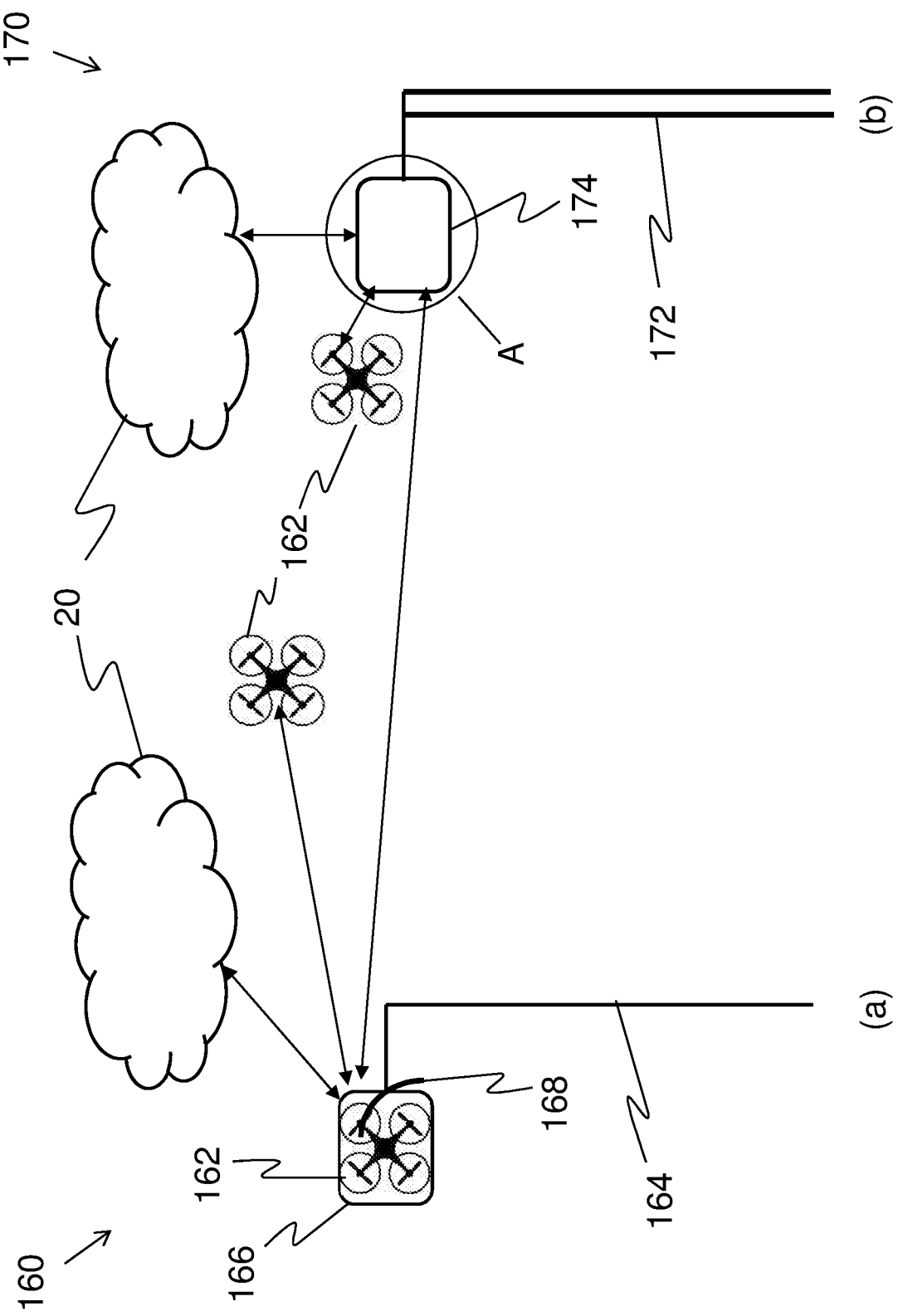

FIG. 5 is an isometric representation of an exemplary luminaire and its optical elements, in accordance with embodiments of the current invention; and FIG. 6 is a schematic representation of two exemplary drone-system configurations, in accordance with embodiments of the current invention; and FIG. 7 is a block element diagram detailed view of the enhanced drone stationary pedestal shown in FIG. 6, in accordance with embodiments of the current invention.

DETAILED DESCRIPTION

The current invention relates to an outdoor lighting system and specifically to systems and devices used to illuminate streets, roads, parking lots, railways, and large outdoor areas. More specifically, embodiments of the current invention relate to lighting systems that provide both a lighting function and a processing platform having connectivity such as IP connectivity and connected elements.

The system described is a pillar (also referred hereinbelow as "streetlight") which connects and enables the creation of connected street, connected city, connected person, connected vehicles and connected elements that surround the inhabitants of the urban environment of the future.

Embodiments of the current invention, as described herein, are related to the above-mentioned elements (i.e. LED lighting, IoT, Smart city, and connected person-streets-elements concept described hereinabove). Based on a LED street light solution and adding to it the benefits of computation and connectivity in a unique architecture, embodiments of the current invention enable transforming existing urban electricity and lighting networks into a new and flexible platform providing smart and innovative solutions to cities and urban areas and their living and mechanical inhabitants.

Figure 1:
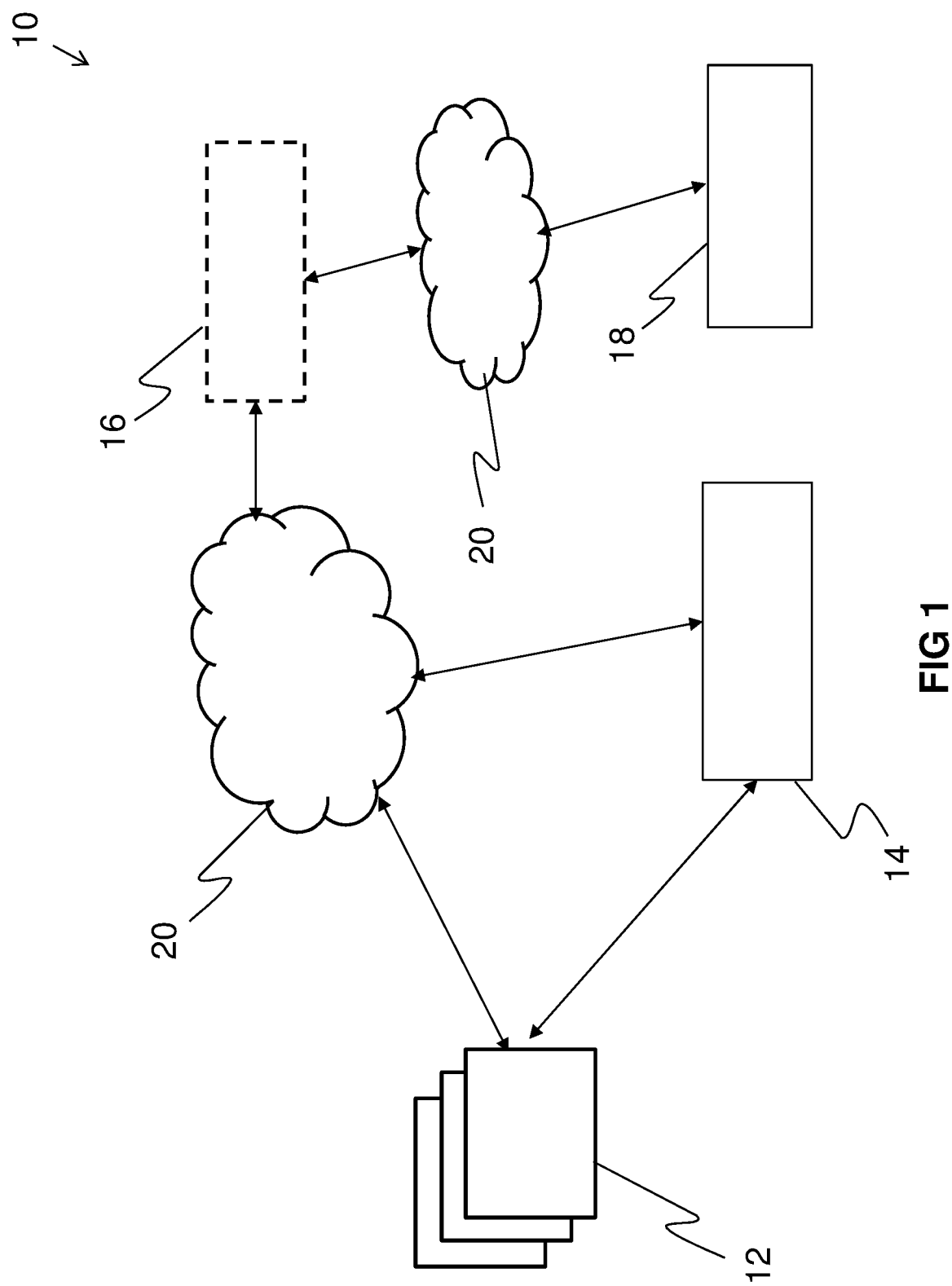
FIG. 1 is a diagram of an outdoor lighting system and its elements, in accordance with embodiment of the current invention.
Figure 2:
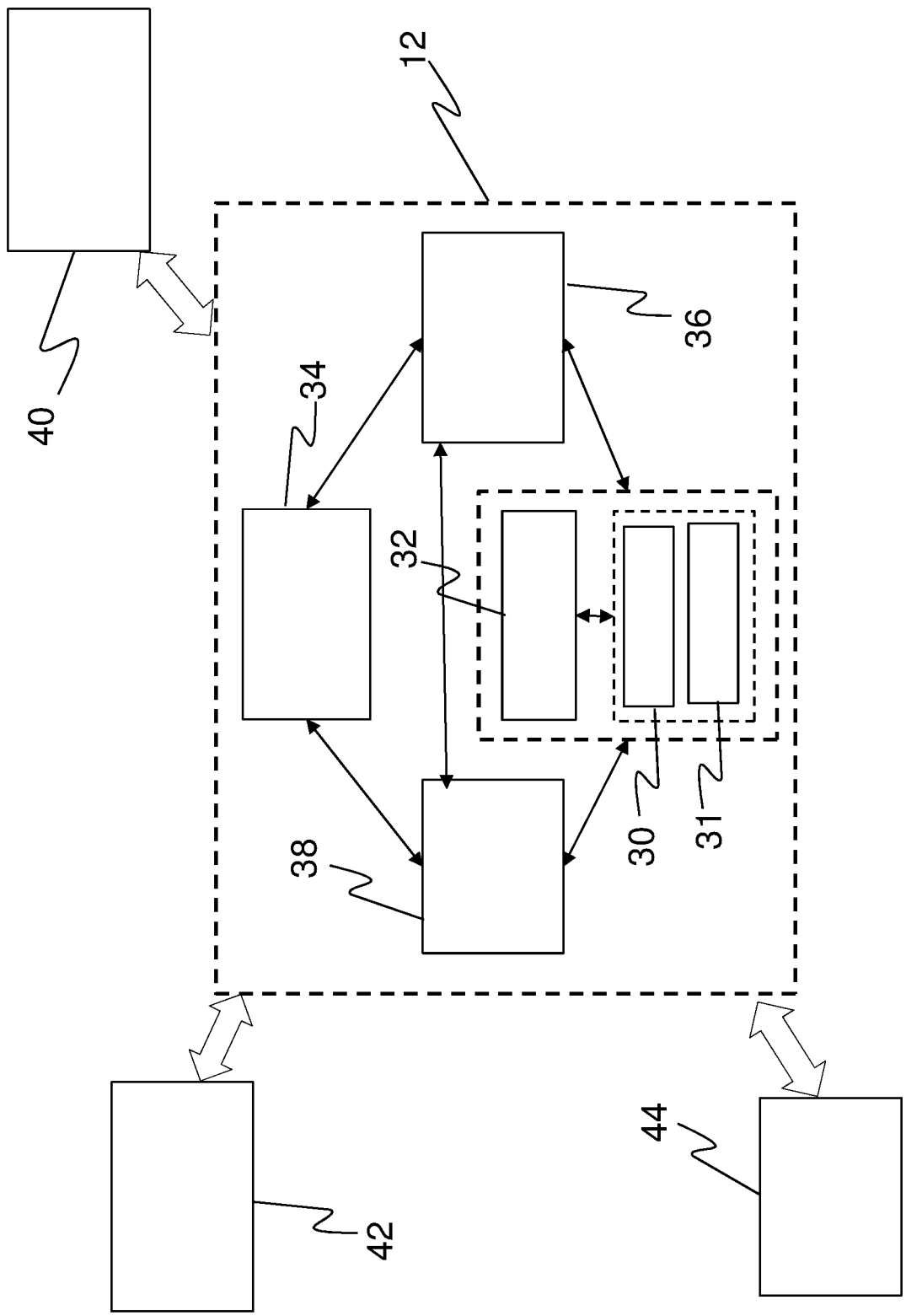
FIG. 2 is a block diagram of the luminaire device shown in FIG. 1, in accordance with embodiments of the current invention.

Reference is currently made to FIGS. 1-2, which are diagrams showing an outdoor lighting system 10 and its elements, in accordance with embodiment of the current invention. Outdoor lighting system 10 includes: a plurality of luminaire devices 12 (also referred to as "luminaires" and "street lights"); a plurality of street devices 14 (such as, but not limited to drones, vehicles, pedestrians, mobile devices, IoT devices, and advertisement boards), at least one remote processor 16; at least one secondary processor 18 (such as, but not limited to: an app provider, a service provider, and a data processor); and a cloud connectivity 20 (also called the "cloud", as known in the art). Street devices 14 are connected with luminaire devices 12, as indicated in the figure, by an array of methods including, but not limited to: single or multiple wireless or wired connections, cellular, Wi-Fi, LWPAN, Zigbee, fiber, satellite, mesh, star, and point-to-point. The remote processor and the secondary processor are connected with the cloud, as shown in the figure.

FIG. 2 shows a block diagram of luminaire device 12, shown in FIG. 1, in accordance with embodiments of the current invention. Luminaire device 12 includes: a processor/controller 30; an App Engine 31 (which includes a processing element/general purpose computer which may run a standard operating system (OS)); power related elements 32; lighting-related elements 34; communication elements 36; and internal sensors 38. Luminaire device 12 interacts, as shown in the FIGS. 1 and 2, optionally and/or alternatively with external communication elements 40 (such as but not limited to: the cloud, communication concentrators; and a controlled-mesh network); electromechanical drone-related elements 42; and external sensors and associated devices 44. Additional functionality of App Engine 31 is described further hereinbelow.

Alternatively or optionally, part of or all of the elements shown in FIG. 2 within luminaire 12 may be configured outside of/remotely to luminaire 12, mutatis mutandis.

In one embodiment of the current invention, luminaire device 12 is implemented within an electromechanical device or POD/enclosure that contains electromechanical and communication modular interfaces to external devices such as elements 40, 42 and/or 44 in FIG. 2 (such interfaces are depicted as thick arrows in the figure). Furthermore, device luminaire 12 contains all or part of the elements depicted within the luminaire. For example, luminaire 12 can contain elements 30, 31, 32, 34, 36, 38, or any part thereof, with lighting-related elements 34 not integrated within luminaire 12.

Processor/controller 30 serves to process lighting related functions of one or more lighting-related elements 34. Processing functions include, inter alia, any combination of:
  receiving lighting or luminance related data from one or more lighting related external sensors 44 of one or more lighting elements such as LED arrays;
  obtaining input data related to power related elements 32, such as but not limited to: power or power consumption or amperage-related sensors of one or more power meters, power converters, power drivers, power readers, and power related circuitry;
  obtaining input from internal sensors 38, such as, but not limited to: thermocouples, mechanical steppers, other mechanical or electro-mechanical engines, moving parts, sensors and actuators;
  obtaining input data from external sensors and associated devices 44, which includes, but is not limited to sensors for: time (ie a clock), GPS, ambient lighting, ambient temperature, humidity, air pollution, noise, acoustic, smoke or other gas sensors or analyzers, humidity, movement, cameras of any sort, LIDAR, radar, wave detector, electro-magnetic radiation, chemical or material related sensors/analyzers, electronic, magnetic, bio-sensors, such as heart beat monitors or light-based monitors, or any other sensor delivering raw or processed information such as with video analytics or fused sensory information or others, in real or not real time;
  processing the data described hereinabove, taking into consideration historical information and decisions; and
  setting system parameters accordingly.
Examples of setting parameters include:
Setting power related elements 32 (such as an LED array) which yields a given illumination level, illumination color, hue, etc;
Setting lighting-related elements 34 (such as mechanical or electrical elements that affect the lighting angle of each LED array);
Basing a decision to set lighting parameters on desired levels, hues, colors, angles etc. at one or more ambient conditions, where the at least one processor considers current conditions against desired condications and dynamically adapts settings to closely follow rules given or deduced from desired specifications for current conditions;
Considering any information of internal sensors 38, such as when the internal temperature exceeds a certain level, at least one processing element reduces the power down by "X" to reduce the temperature, for example, in accordance with a plan for lighting longevity, rather than maximal lighting, at any given time (such as at times of minimal traffic at that location or in general), etc. The at least one processing element takes into consideration priorities of respective lighting arrays according to desired lighting functions, ambient conditions etc.

In addition to the block-elements identified in FIG. 2, luminaire device 12 includes electronic circuitry connected to processor/controller 30 and App Engine 31 and includes an algorithm which serves to monitor changes in the circuit behavior, such as those from input or output current or power levels to deduce changes in the luminaire device. Such changes impact relevant parameters to achieve desired performance, such a, but not limited to: maintaining stable lighting level over time; compensating for malfunctions or failed LED elements; and changing power levels.

Monitoring and changing parameters can serve, for example to modify/replace conventional pre-set compensation mechanisms used in advanced luminaires and LED drivers, which are currently based on future estimations/projections, by an accurate, responsive and more efficient mechanism having incidental minimal addition cost to the system—as described hereinbelow. Additionally, monitoring and changing parameters can be applied, combined with a multi-channel LED array and separate drivers for each channel, where there can be cross-channel compensation for malfunctions. Finally, the parameters can be applied to change illumination characteristics to suit changing operation conditions (e.g. change color in case of fog).

Figure 3:
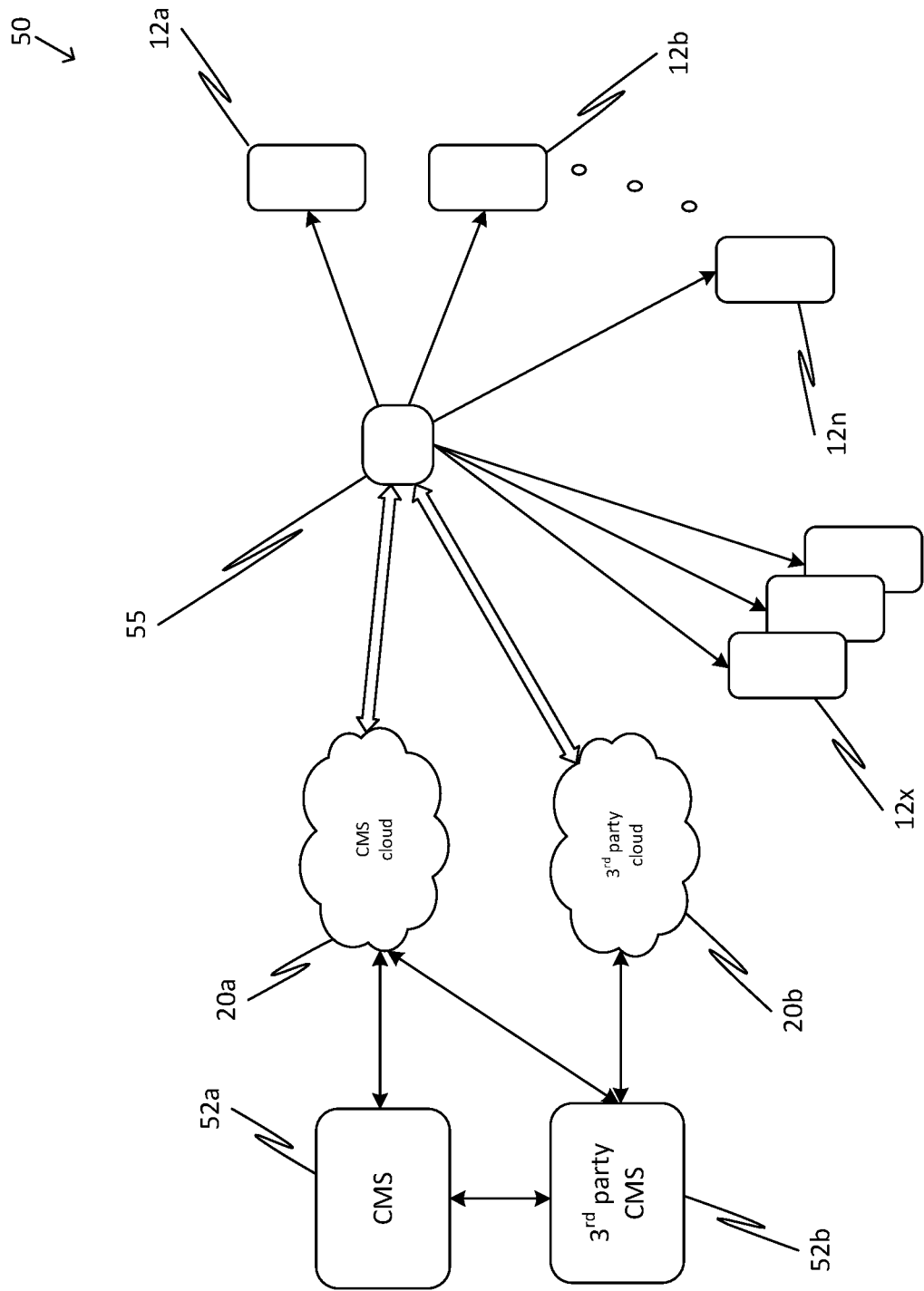
FIG. 3 is a diagram of a network of outdoor lighting systems, including a main control and management systems (CMS) and a third-party CMS, in accordance with embodiments of the current invention.

Reference is currently made to FIG. 3, which is a diagram of a network of outdoor lighting systems 50, including a main control and management systems (CMS) 52a and a third-party CMS 52b, in accordance with embodiments of the current invention. Apart from differences described below, luminaire devices 12a, 12b, 12n and 12x indicated in the current figure are identical in notation, configuration, and functionality to luminaire devices 12 shown in FIGS. 1 and 2. Main control and management system 52a collects data from some or all luminaires 12a, 12b ... 12n. The network further includes a concentrator 55, which is an optional component, acting as a gateway or proxy or router for the communication with/to several luminaires 12. In some embodiments, Either by polling or querying them or in an un-polled configuration, initiated by the luminares themselves, one or more at a time, or by concentrator 55, or by another trigger such as third-party party application, such as in third-party CMS 52b. In some embodiments, CMS 52a manages lighting functions of at least one of luminaires 12a, 12b ... 12n ... CMS 52a starts or stops or dims or optimizes or applies any pattern of lighting or program lighting, downloading to the at least one of luminaires 12a, 12b ... 12n, activating, deactivating, manipulating, configuring or otherwise monitoring and controlling the luminaires. In some embodiments, CMS 52a is configured to monitor or control functions, software, applications, hardware or other components of one or more of the luminaires. Such management and manipulation and control may be based on the data or the function of a singular luminaire, for example 12a, being managed at a given instant, The management and manipulation is also done in coordination with functions or activity of other luminaires, or their control or monitoring by CMS 52a. For example, CMS 52a may instruct or command in real time or offline luminaire 12a to illuminate at a specific lamination level if a motion detection sensor of an adjacent smart luminaire, e.g. 12b, reports detection of a motion. Alternatively or optionally, CMS 52a controls lighting functions of luminaires 12a and 12b to direct their respective lighting beams at certain angles and/or to control respective optics, dimming and/or lighting hue or light spectrum and/or intensity and/or any other attribute, so that the luminaire combined lighting at a certain point on the road or sidewalk satisfies certain conditions or requirements, such as, but not limited to eliminating shades or escorting a moving vehicle. Further, CMS 52a informs inform third parties such as CMS 52b, or publish, rand receive third-party requests, or to receive software and applications from third-parties, or function calls to initiate authorized activities to be run by CMS 52a or to be directly run by luminaire 12a, inter alia.

In some embodiments, third-party applications or software or data is downloaded into at least one of luminaires 12a, 12b ... 12n in a synchronized and guaranteed manner. This is done either via CMS 52a and/or via a third party cloud 20b, if authorized first via CMS 52a for at least one luminaires 12a, 12b ... 12n according to authorization schemes and database and service agreements associated with CMS 52a In some embodiments, at least one of luminaires 12a, 12b ... 12n communicate with at least one other luminaire, for via concentrator 55 as a communication proxy, yet without proxying or involving CMS 52a or any other centralized CMS (not shown in the figure). Respective luminaires trigger communications, send sensory or other data to any of the other luminaires in a given communication group, receive data or other information from any other luminaires, request an application or software to execute certain functions, conditionally or unconditionally, coordinate the at least one luminaire operation of some of its functions or hardware in concert or according to the data or timing or other parameter relative to any of the other luminaires. CMS 52a is informed of such communications CMS 52a optionally or alternatively intervenes, confirms, dis-approves, and remains "transparent"/non-intervening per its programming.

In some embodiments, sensory information from at least one of luminaires 12a, 12b ... 12n one smart luminaire may be sent to other luminaires which either have or do not have a similar sensor installed or associated therein. Such information triggers the luminaire activity or functions therein. Alternatively or optionally, the information is fused or combined with other sensors or other information or other conditions or software instructions to generate activity or control of functions in any of the luminaires. Such fusion is done at least one of luminaires 12a, 12b ... 12n, or at the CMS 52a for at least one of luminaires 12a, 12b ... 12n, or in both the CMS and the luminaire(s)—as a distributed processing and decision making and control even for the respective luminaire.

Figure 4:
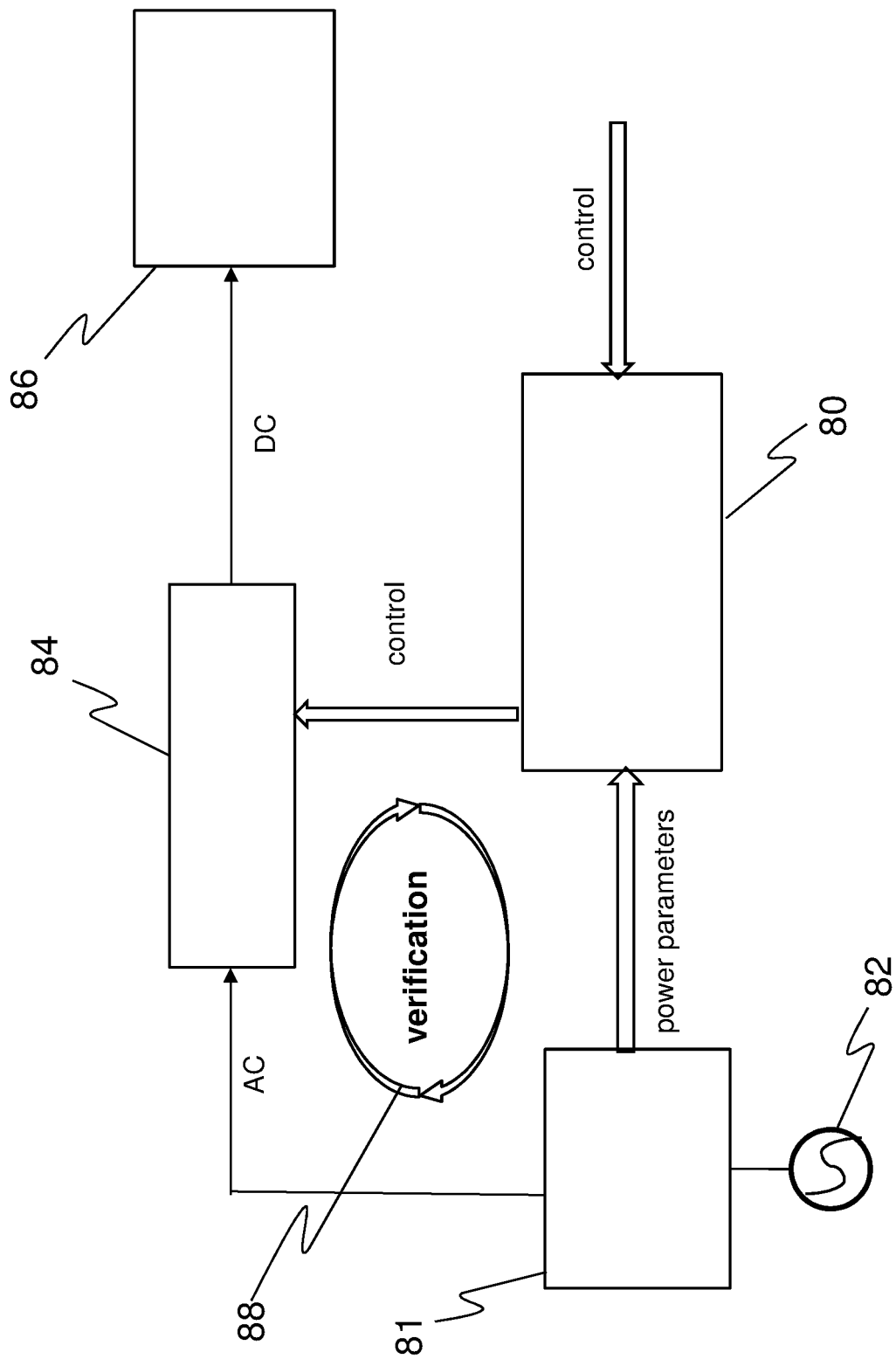
FIG. 4 is a block diagram of an LED failure compensation and power stabilization mechanism, in accordance with embodiments of the current invention.

Reference is currently made to FIG. 4, which is a block diagram showing a controller 80 (which includes an algorithm, not shown in the figure) for LED failure compensation and power stabilization mechanism with associated elements and electronic circuitry, in accordance with embodiments of the current invention. [In one embodiment of the current invention, controller 80 forms part of processor/controller 30 described hereinabove in FIG. 2. A power source 82 (typically mains power) provides power to a controllable LED driver 84. Controller 80 receives external control commands and/or the controller is preloaded and pre-set with a set of desired operational parameters. The controller is connected to a power monitoring module 81, receiving power parameters sent from the power monitoring module. Examples of power parameters include but are not limited to: input power, current, and voltage.

The controllable LED driver 84 receives control commands from controller 80. An open circuit protected LED module 86 receives DC power from the controllable LED driver 84.

The controller 80 and algorithm monitors changes in the behavior of the circuit, such as in the input or output current or power levels to deduct changes in the luminaire. As a result, controller changes relevant parameters in order to achieve a desired performance—such as maintaining stable lighting level or power level over time or compensating for malfunctions or burned LED elements in the LED module; or changing power levels etc. (as pre-set, and/or defined by external control).

Controllable LED driver 84 and LED module 86 may represent a multi-channel LED array and separate drivers for each channel, where the described circuit can provide cross-channel compensation.

The described circuit has also the ability to automatically change illumination characteristics of the LED module to fit changing operation conditions (e.g. change color in case of fog).

The verification process 88 described above, occurs continuously, and provides power adjustment and compensation to changes in parameters as detected received from the monitoring device 81.

Further functionality of controller 80 is discussed hereinbelow.

Reference is currently made to FIG. 5, which is an isometric representation of an exemplary luminaire 150 and its optical elements, in accordance with embodiments of the current invention. The exemplary luminaire includes the following exemplary optical elements: a LED metal core printed circuit board (LED MCPCB) 152; a plurality of LED's having a primary optical lens 154; a plurality of optical reflectors 156; and a plurality of heat sink fins 158.

As shown in the figure, the optical elements are part of a set of a plurality of reflectors and lenses, along with a group of LED elements. The elements can be modified and set to create different illumination patterns, as known in the art.

The luminaire (composed of the optical elements) is connected to a control element (such as part of processing and storage elements 30, as described in FIG. 2 hereinabove) which modifies the illumination level according to any of number of road and environment variables listed hereinbelow. The luminaire is connected with an on-ground unit, or a sensor/processor (as part of external sensors 44, as described in FIG. 2) that serves to analyze road characteristics and data and conveys a required illumination pattern to the controller within the luminaire.

A network of luminaires—such as shown in FIGS. 1 and 3 hereinabove—can be controlled according to the above data and can be dynamically and adaptively adjusted to optimally fit the road scenario, including such as, but not limited to: changing weather conditions (i.e. snow, fog, haze and off-road reflection); traffic density; type of traffic; ambient lighting changes (ie other lights, moon, sun, etc.) air quality parameters; pollution state; and measured or predicted or anticipated conditions according to historical data or pre-configured or currently reported conditions or parameters or other heuristics or derivative of measurements or learning machine (Artificial Intelligence) or any other mathematical prediction function, from a respective streetlight's sensors or processing elements and/or from other streetlight sensors or from other resources or any combination of such.

Maintaining a desired level of illumination for a target area is performed by employing an automatic mechanism (having both hardware and software components) to both actively maintain the desired illumination level and to overcoming individual diode burnout or output degradation—as indicated in FIG. 4 hereinabove.

In addition to the power input level measurements described above, the following embodiments are optional or alternative:

Measuring actual lighting levels at or near the target area by direct measurement of the actual illumination. This is very accurate in terms of measuring the actual illumination level versus a desired one, rather than deducing the level from some source/generator/engine measurements. Such direct measurements may include: marks/markers being configured near objects in the desired illumination target area. For example, one or more signs, images, colors, strips, shapes or reflecting objects such as poles, lighting "cat eye" etc. are configured on a road, pavement, lamp post, house wall etc. (This type of measurement is analogus to in similar fashion to a manual "eye check" performed by an optometrist.)

Incorporating other markings (as described hereinabove) to include non-specific and non-specially designed objects that are already part of the scene. Examples include, but are not limited to: parking-related markings on the curb; a fire hydrant; a detail of a bus station; and a wheel of any parked car.

Such measurement can require a learning pattern or calibration process. Exemplary patterns can include, "measuring" during full daylight of a grid, or scale of colored or black-white strips or other shapes marked with special colors and/or different strip properties such as size or color or reflectivity, and comparing the measurements to those performed at nighttime, or changing the illumination level and measuring until an optimal result is obtained and then maintaining it stable, etc.

An algorithm used in such an illumination processor (ie "engine") can include measurements to remove false readings. For example, an image on the road may be partially or fully blocked due to a passing or parking car or another object. The processor learns these patterns, compares them to other information (such as data from the lighting source such as an illumination sensor at the engine or measuring the temperature associated to the lighting panels or the input power to it) etc.

Optionally or alternatively, embodiments of the invention include markers, or dedicated sensors, configured at the target illuminated area, having a short-range transmitter to transmit illumination data back to the lighting engine, hence closing the loop.

As noted hereinabove in the description of FIG. 2, as part of communications elements 36, a connectivity module, based on technologies such as, but not limited to: Zigbee, LOWPAN6, Wi-Fi, Cellular, Fiber, mesh, proprietary, PLC, and any other, IP-based connectivity is connected to processing elements 30 (ref FIG. 2). Information to and from the luminaire is transferred to/from remote processor 16 (as described in FIG. 1), such as a network control center/server, network operator a remote unit. Remote processor 16 is part of external communications elements 40, as described in FIG. 2 hereinabove. Such information can additionally include software modifications/upgrades and user/system commands—as well as information from the current luminaire to other luminaires and/or sensors. Lighting levels are coordinated when the current luminaire is in communication with adjacent luminaires.

Additionally, connectivity of the luminaire includes connectivity with: a remote App-store or similar offering relevant applications including from certified $3^{rd}$ parties; passers-by such as connected cars; pedestrian smartphones; smart meters such as utilities meters (water, electricity, gas, . . . ); "Smart City" elements such as cameras and other sensors or processing elements; traffic lights and traffic control (including the possibility to involve algorithms and logic of the processing elements in the luminaire to control the aforementioned elements. Other possibilities include: functionality as a communication proxy (including as router or repeater) between other processors, sensors etc. and same or other remote servers; providing wireless communications hot spot or connectivity (Wi-Fi, LTE or other); providing a backhaul communications link (from users to the cloud or central communications network; for "last-mile" communications) to be distributed to residential or office locations, including performing or functioning as a "concentrator" or "aggregator" for many IoT device types and devices. In such cases, connectivity can serve to provide pre-processing services for these devices and their information, for example compressing their data for a lower volume communication thus saving cost, power and time and accommodating more IoT devices to communicate, or to extract the more important or relevant information.

App engine 31, described in FIG. 2, is an optional additional processing element that runs typical consumer-grade or telco-grade or enterprise-grade Operating Systems (OS) such as Android, Linux, Apple iOS, Windows, Chrome etc. The processor thus runs generic or platform-specific software applications and uses special barriers to provide isolation from lighting processing elements 30 (of FIG. 2) in hardware and/or in software to minimize potential impact of applications on lighting, such as: overloading the lighting processor; harmful control of the power drivers or any other lighting-driving or sourcing or service affecting; sending rouge incorrect commands as if coming from a valid remote management system or user; hardware means may include physical identification whereas software means may include software abstraction layer, APIs, certification mechanisms such as Radius, HTTPS, encryption-based, proprietary, or others.

The App Engine allows certain verified communication and control over the luminaire or luminaire-related and other peripheral systems controlled by the luminaire processing system to communicate with the lighting processing element, so that:

Lighting/lamp related information that is valid to be exposed to external applications is thus exposed, or is made available. This can be further exemplified by the way GPS or gyroscope or other sensors in a smartphone are handled by the OS, APIs and Apps. Similarly, the lighting or lamp-related hardware, mainly luminaire related and luminescence related sensors, optics electro-mechanical controllers, actuators or dimmers, may be incorporated to existing OSs and such as Android or iOS or Windows, require authorization for each Application to access, see or handle them, share their info with other applications or softwares etc.

Valid commands that may impact the lamp performance in permitted applications and scenarios (e.g. an application that is run on the App Engine, for identifying free parking spot by utilizing external vision systems, for example, which causes a change in illumination to signal to a connected car, directing it to the available parking location), or motion detection, or thermal detector, or any other sensors, or combination thereof.

The term "generic application" is intended to mean an application, or software, that was not designed especially for the luminaire platform, meaning applications that can be typically downloaded from an app store for Android Operating Systems (OS) or iOS or Windows or others. An example includes a ride-hailing application for sensor monitoring or sharing application or a video analytics software or an available parking detection application. The generic application may have been adapted for the described platform or processor similarly to adaptation of applications or softwares for them to run on specific hardware or version of Operating System (OS) or work with a specific set of sensors or other hardware components or drivers or similar.

The App Engine further:

Receives input from any sensors such as ambient temperature, ambient air pollution/quality, humidity, rain, wind, smart meters, passers-by smartphone carrying a multitude of sensors, connected cars sensors etc.;

Runs an application, alone or coordinated or distributed with other lighting lamps and processors or external elements (such as said smartphones, cars, connected wearables, etc.) that provides lighting to physically impaired passers-by, such as people with eye conditions, old, drunk, or on-contraire—people that move fast and need relevant lighting such as joggers;

Runs streetlight an application that identifies driving-under-the-influence or otherwise hazardous driving, such as for example according to the flash-light and/or tailgate lighting movement patterns of the car, or of the car itself, either in the processing element or remotely or in an attached camera, or when sharing raw or processed data or other information or decision making with other processors or streetlights and then alerts authorities, alerts passers-by even including such that are in the route of the vehicle and are under the area controlled by another lamp or communication device, change the lighting conditions on this lamp and/or others to (a) alert such passersby more vividly and/or (b) adapt the lighting available to the driver of such vehicle so to try and minimize hazard by him/to him, for example by increasing the light in his route more than the standard strength provided for regular or normal drivers on that street, or adapting the angle of the optical element or elements in this streetlight and/or in others that are in direct communication with this processor or via the cloud or another processor;

Runs static, dynamic or reactive or interactive advertising, which may in connection to interaction with other sensors, connected cars, smartphones, etc, or information from the cloud, the control center or other luminaires. Advertising information may be streamlined or downloaded from afar, or stored locally and used according to a decision of s/w residing in the App Engine. The displays may be either attached to the luminaire or the pole or remoted from it yet with communication to it, for example billboards, walls of buildings or others. In some embodiments, the processor may coordinate special lighting effects to the content displayed. Then adding dependencies as to the color, strength, angles, and timing, as well as to "escorting" viewers such as cars and pedestrians with the right combination of light from the multiplicity of streetlights onto a building wall that is used as a billboard or display. This may minimize the electricity costs for the building wall or a bus stop advertisement operator as lighting will be operated/enhanced only when "sufficient" or "good enough" viewership is determined.

Further, the processor can coordinate the lighting colors and strength and angles and any other parameter to the content displayed, so for example, the higher part of the building is illuminated in a certain pattern while the lower or middle parts in different patterns, or when a specific image or text is displayed a pre-designed or learnt lighting pattern is directed to illuminate it, including from two or more streetlights in its vicinity. Or, the lighting angles may change as the processor controls the electro-mechanical or optical elements in the luminaire, in coordination and synchronization with the content being displayed, or the viewers angles, or other streetlights luminaires, so that, for example, a 3D depth viewing is achieved when viewing from a specific location or angle or direction, from a 2D display, or a wall or similar.

Above includes warning signs, road and pedestrian notifications, control of projection or display means or signaling elements, which are included in the luminaire and controlled by the lighting controller or are separate from the luminaire. Earthquake detection using any combination of a multitude of detectors (that can be low-cost or less sensitive than those in use in professional earthquake detection stations) and special real-time and non-real time algorithms to analyze the incoming data; option/ability to fine-tune the detection and data as a response to certain data analysis and scenarios.

Same as previous item for fire detection, pollution (including accurate per street/GPS location) reading and rating, noise levels, etc. The GPS or other location information from any of the onboard sensors or external sensors or received information can be shared with all running Applications or softwares. Similarly, any other sensory information, or processed analyzed output of such, may be thus shared locally and between connected streetlights, if authorized.

In embodiments of the current invention, the streetlight acts as a "guard" (or "Light Watchdog") for vehicles or other property, people etc. An example is anti-theft parking. When the connected car is parked, and anti-theft app is activated, an app running on-board the car sends periodic beacon/keep-alive/of the signals. The closest smart streetlight monitors the signal, so that if the signal changes, the vehicle owner or police are alerted. The app start/stop may be performed by the car or by the owner smartphone app, which is better because maybe it's more difficult to counter-fit. Similarly, the monitoring is performed done visually, via video analytics such as identifying "violent penetration" patterns or in the case of vehicles—moving from one area to another without the app being stopped first (so that there is no need for a connected car constantly transmitting—a simpler FIR or similar sensor may be able to do the job and there may be no need for a camera). Similarly, the application may be applied to prevent theft of bicycles and motorcycles, etc. Similarly, the streetlight processor and sensors, from same streetlight or connected ones or additional sensors, can monitor against arson or vandalism of monitored elements such as vehicles, shops, buildings etc.

Embodiments of the current invention include a device, system and method to watch against auto-theft and/or abuse, vandalism or any other undesired activity.

Embodiments of the current invention employ a logical "locking" mechanism that is triggered on/off (or enable/disable) either by a user or automatically by the device being monitored or from remote. Thus, the invention allows a new method of watching and safekeeping—pay-per-watch, or subscriber-based, without any installation in the monitored object.

Current methods such as used for monitoring vehicles against theft or vandalism typically use a device being installed in them, such as a GPS-based processor being used to monitor its own movement and send alerts over an installed cellular modem, etc. These methods are of course more complex, cost more, depend on installed equipment (such as its health and well-being and no faults), depend on the service provider of that installation, the health of the cellular modem, not jamming-proof, cost more, need to install the device in a hidden location (which the thieves are many times quick to learn), not protecting against vandalism such as exterior vandalism, arson, not suitable for all types of objects (e.g. not suitable for bicycles) etc. The current invention overcomes all these shortcomings because no device or other equipment or software are being installed in the monitored object.

Embodiments the current invention include at least one monitoring element (ie "sensor" as part of external sensors 44, described in FIG. 2) that is installed within an outdoor device. It is implemented in hardware and/or software. It monitors the events in the street, parking lot, roadside or any other outdoor space. The device has sensors and/or detectors, such as but not limited motion/movement/visual detection using current technologies such as PIR (Passive Infra-Red), Infra-Red (IR), LIDAR, MW (Microwave), camera, area reflective such as infra-red emitted from LED, ultra-sonic, light reflection sensors (where the different reflection of light, such as emitted/generated by sun-light and/or the streetlight LED luminaire, is reflected from surfaces in the street/open space and measured and differences are identified) or any other passive or active wave-based or other detection motion of the open space being monitored.

Sensors that form part of embodiments of the current invention are typically installed inside or mounted in conjunction to the street lighting devices such as the LED luminaire, the streetlight pole, mounting, cover, or on any other outdoor equipment, such as electric pole, telephone pole, cellular towers or antennae etc. The sensors may likewise be mounted on mobile overhead platforms, such as drones.

In some embodiments, the apparatus included or associated with the processor, internal sensors, communication modem antennae or other components, external sensors or interfaces to such, drone landing or docking station or the other components in this invention, may be installed on other platforms or mountings. For example, on traffic lights, billboards, buildings walls or roofs, on moving vehicles, on ships etc.

In embodiments of the current invention, a user that has a mobile device (such as a smart watch, wearable computer, smartphone, tablet etc.), triggers a "watching"/monitoring function in the streetlight or other network element processing elements. For example, the user may park his vehicle in the street. He then runs an application on his smartphone or presses a button on his smart watch or on the vehicle processor user interface. The user command is sent to the managing entity running on some processor along with the location of the user and/or vehicle. Such location may be based on GPS, cell ID (cellular or Wi-Fi), beaconing data or any other. The information is then processed by the management entity. It may inform relevant streetlight monitoring elements or processors that such a request was issued. It identifies "relevancy" according to location matching between the location of the user or vehicle (or other watched object that has location information associated with it), and the known location of the monitoring sensors and/or processors. Even more so, a closer matching and more accurate one may be done for specific locations using the information known about the coverage area of each such sensor (such as area, angles, height, unmonitored areas etc.). More than one monitoring element may be alerted, for example if the monitored object (vehicle in this example) may be covered by sensors mounted on more than a single streetlight, such as subsequent streetlights or opposite-side streetlight etc. The user may then be given an indication that the monitoring has been set/triggered (with or without a "delayed action" timer allowing him to get away from the monitored object without setting an alarm). Such notification/indication may be visual, audible, or other. The user, or his processing device, may also be asked to perform a "handshake" procedure with the on-site monitoring element (or more than one), such as to transmit a short sequence over Wi-Fi, cellular, Zigbee etc. During this handshake, unique information may be passed securely from the monitoring element or the monitoring management element to the monitored object such that may be used during this subsequent watching period. Such information may include secure code or key that the object shall transmit (ciphered/encoded or openly) during pre-established periods/intervals or any other session related information to be agreed by both or commanded by the monitoring element. For example, a LED-based visual identification pattern (such as short flashing etc.). Information may also be sent securely from the monitored object and/or user application or device, during the triggering of the session, its set-up, or the handshake. Such information may include user or object ID, parameters about that, payment details, subscription details, unique IDs, keys, etc.

In embodiments of the current invention, the watching and monitoring of the object may be done by the sensor or sensors identifying "keep-alive" notifications done by the vehicle. All or part of these actions and algorithmic steps may be done automatically. For example, the triggering may be done automatically, for example where the vehicle processor identifies that the user/drive/owner smartphone or other processor or application has distanced from the vehicle (proximity based), with the doors going locked and/or with other indication, so it automatically sends such request to be monitored request to the watching management element. The handshake process is performed automatically by the vehicle processor, whether or not a driver is present, and/or by the mobile user device. An application on the user device identifies the user's presence/absence from the vehicle and triggers a request for monitoring or any other portion of the process automatically or commands an object processor to do so.

Similarly, the setting off of the monitoring session is also done either by the application on the user device and/or combined with the vehicle (or another object) processor. Either manually or automatically, such as upon the user getting into the desired proximity from the object.

In embodiments of the current invention a mobile "watcher" may be alerted. For example, a user who pays extra may call such a watcher. Or the system may use it at random, or in areas where there is no sufficient coverage of statically mounted sensors on the streetlights, or if the said object is identified to be of more value or in areas recently identified to suffer from higher crime rate or if the mobile watcher (e.g. a drone) has nothing better to do at that time or loitering around, etc. Communicating with the mobile watcher is done also via the same algorithms described above, and in concert or coordinated with the cloud-based or other management entity and or the static sensors directly communicating with this mobile watcher for that session period.

The monitoring sensors may use "beam forming" to continuously watch over multiple objects in its coverage areas, or a "scanning" pattern so it watches over a limited number of objects (usually one) at any given point in time and then moves on to watch another one, unless triggered to stay watching the first one due for example to an event or suspicious of event or prediction of events or another sensor in the network just now monitoring the other (Second or other) object, when the sensors are communicating and coordinating their scanning or identification or alerting processes over local network (e.g Zigbee, 6LowPAN, vehicle communication protocols etc) or via the backbone (cellular, cloud), which is currently less effective or desired but sometimes necessary (such as if no local network or communication modems are installed on one of the sensors).

If more than a single sensor is watching over an object, and a handshake is being utilized within the watching session, then any information or data (such as unique ID or security keys) exchanged between one sensor and the object may also be exchange, as is or modified (such as used to generate a new security key) also from the object to any other sensor, or between the sensors themselves.

One of the monitoring elements, or the monitoring management, may command a certain streetlight luminaire (or more than one), either locally or from remote respectively, to light up or light in a certain direction or at some specific area, in order to improve sensing capabilities of some sensors, such as a camera or motion-based sensor etc.

The monitoring processor may then identify suspected conditions. For example, it may identify scratching sound (such as when someone scratches the paint of a vehicle), a breaking glass/window sound, a proximity of a person to the object, a sharp movement in the proximity of the object, a partial-disappearance of a person in the proximity of the object, a strong or other light-pattern associated with fire or arson attempt etc. It may also identify movement of the object. Such identifications may be done by a single watching sensor or in concert/coordinated/validated/complementing by several of them, on the same lighting luminaire of on different ones or with the mobile watcher. Similarly, the lack of any agreed periodic information (such as the beacons, or WiFi messages or LED flashing patterns etc.), or its faultiness (e.g. diversion from the agreed patterns or data in the messages etc.).

The streetlight or other monitoring processor alerted to the suspicion activity (such as breaking in attempt, stealing attempt, vandalism attempt etc), may respond by alerting the user via his connected device or any other means or any other person or entity (such as the police). It may alert a mobile watcher to come over. It may alert locally or over the backhaul network instruct its own streetlight luminaire or any others to light up or down of increase or reduce or use different LED colors or move its LED light beams or sound alert via an installed speaker or other audio device or any other pattern to deter the potential hazard/intruder/vandalizer/unwanted activity and anyone else in the vicinity. It may further use a "IoT-crowd/social" algorithm to request other connected objects (either also being monitored or otherwise simply connected via the cloud with the monitoring management entity or locally with the watching processor) that are in the vicinity to use their deterring means, such as vehicle lights, sirens, horns etc. so the whole vicinity becomes alerted. Of course, such social usage of multiple objects dramatically increases the impact of a watching service, its effectiveness and the cost/performance ratio of using connected objects. One device being randomly sufficiently co-located with another device is watching over and that device, and/or alerting the environment if so requested, either on a paid basis or voluntarily.

The service may further notify other people in the vicinity. Such people may be registered in the management system as "watchers", either paying for their service or as volunteers.

In some embodiments, the streetlight communication network and capabilities are used to continuously alert and signal the route of a stolen object being carried or driven away. For example, streetlight after streetlight may flash the LED lights, move their beams, turn them on-off in any desired pattern, light over the moving object etc so that the whole environment of the moving object is aware of that. It may also report back on its movement and location. Such usage of the lights is possible due to the LED-based luminaire capabilities of easily controlling the LED light strength, luminescence, number of LEDs being used, direction of the LED, etc.

In some embodiments there is no communication with the monitored object but only with the user. For setting/triggering on/off the watching request, reporting back to the user etc.

The streetlight watching processor may handle all local activities locally and communicate with the monitoring management when needed, and directly via local network or via backhaul with other streetlights in the vicinity, with other sensors such as the mobile sensor in the vicinity or alerted even if remote, with local monitored objects, with local connected objects that are not watched over but "volunteer" or registered to perform some activity on-demand such as alerting the environment using their means, with local or remote people or users or owners or entities such as the police etc.

In some embodiments, information such as consider information and commands coming in over the communication element from any other lighting processing element, sensors, or remote. Considering such information may include the lighting levels at the adjacent lighting engine/lamp, so that a coordinated, synchronized, compensating, or other correlated lighting may be instructed. For example, a light bubble, or area of interest, that is synchronized between several lighting engines, or polls, or beams. Synchronization may be over all the time or part of the time. It may coordinate the area of interest lighting level at that spot, lighting color (that may be combined of several differently-colored beams from one or more engines or arrays), hues, shade or lack of shade, patterns (such as flashing at a specific tempo), etc. The streetlight processors, or remote management system, may further coordinate this synchronization so that the area being lighted, or shaded, is moved around dynamically such as to follow or light up for moving objects such as pedestrians, vehicles, autonomous vehicles etc.

Reference is currently made to FIG. 6, which is a schematic representation of two exemplary drone-system configurations 160 and 170, views (a) and (b), respectively, in accordance with embodiments of the current invention. System configuration 160 includes: at least one drone 162; a pedestal (or "pole") 164 securely installed in the ground or an adjacent building (neither shown in the current figure), a drone stationary pedestal mounted at the upper part of pedestal 164 and having a mechanical drone retention mechanism 168.

System configuration 170 includes: at least one drone 162; an integrated elevator mechanism/pedestal (or "pole") 172 securely installed in the ground or an adjacent building (neither shown in the current figure), and an enhanced drone stationary pedestal 174 mounted at the upper part of pedestal 172. The elevator mechanism serves to convey packages typically carried by the drone to and from the pedestal. Both system configurations 160 and 170 include communications with cloud 20 and with the at least one drone 162. Details of enhanced drone stationary pedestal 174 follow in FIG. 7.

Reference is currently made to FIG. 7, which is a detailed view of block element diagram of enhanced drone stationary pedestal 174 shown in FIG. 6, in accordance with embodiments of the current invention. Pedestal 174 includes: a drone beacon (for landing/guiding, including RF, optic, and/or light technologies) 176; streetlight engine processor ("street light processor") and communications modules 178; at least one antenna module 180: a power/communications wired connection for the parked drone 182; an electromagnetic pulley/towing/locking mechanism and/or including drone induction charging 184; and streetlight-dedicated sensors (including environmental, lighting, visible, RADAR, and LIDAR) 188. Pedestal 174 is wire-connected to power and communications module 186, which is not located on pedestal 174. As noted hereinabove, pedestal 174 is in communication with cloud 20 and with drone 162. The following discussion details additional embodiments related to the elements of FIGS. 6 and 7.

In some embodiments, the streetlight controller or processor may communicate with autonomous vehicles such as cars, drones, ships or others, either directly or via a proxy, or be notified of their whereabouts or approaching. The streetlight may be equipped with variable wavelength emitting sources, various LED types or other radiating sources, optic or electrooptic filters, beam forming elements etc. As the evolving sensors for autonomous vehicles may be optimally working with different ambient or road lighting or background conditions, the streetlight processor may tune the emitting sources and optics and beamforming to match the autonomous vehicle optimization requirements, to illuminate in different waves or wavelengths or power or angles or wavelength changes or gradients between illuminated areas or patterns various objects or signs etc. For example, the streetlight may illuminate the road sides in different power light or different wavelength or color than the driving lane or the opposite direction lane or the adjacent lane or road shoulders, or the intersections or parts of intersections, or the near field for a moving vehicle vs. the medium field or the remote field, or identified potholes or bumps or other road obstacles or identified pedestrians or animals in the relevant vicinity of the road lane or other objects that may be of interest or of assistance to the sensors and processors of the autonomous vehicles driving systems. Multiple streetlights or wave emitting sources may be used on conjunction or in synchronization to create the multi-wavelength and volume or strength or power or amplitude different road or scenario sensory information for the autonomous vehicles.

Further, the processor and/or the remote management system may decide on lighting or illuminating decisions by optimizing shade or gradient of illumination rather than the traditional lighting conditions. The sensors may either sense the lighting level, or the lack of lighting level, at the desired lighting area of interest, or in the undesired lighting area. Accordingly, the relevant processor may make a decision. For example, it may have, or learn, or otherwise set a desired target for the gradient change between light and shade (or darkness). For example, such gradient may be low or high gradient, i.e sharp or less sharp edges and changes from lighted area to dark area. Another target may be that a minimal level of lighting, or maximal level of darkness (or shade) at any specific or all other areas. So that the whole street is maintained at least, and/or at most, at a minimal lighting level at a certain point in time.

The relevant processor or processors may maintain the desired change levels (or gradients) between shade (darkness) and lighting or illumination with other wavelength emitting sources at a certain level when the lighted area is moved around such as following or heading the moving vehicles.

Similarly, desired level of gradients may be maintained between any other parameter of the lighting or wavelength emitting source, such as different colors, hues, reflectiveness, wavelength, power, angle etc The relevant processor may generate a desired lighting level and direction also according to parameters such as the reflectiveness of the surface or surfaces as being measured. Such measurements may be done once, at calibration, or periodically, or continuously.

The additional processing element (App Engine, as described hereinabove) may be an attachable devise—as an "add-on" or "plug in" to the luminaire, with the needed mechanical and software interfaces available in the system to allow straightforward and fast connection. The App Engine can be assembled on a printed circuit board (PCB) or as an encapsulated PCB, which can be attached or plugged-in by a multi-pin connector to the main board of the luminaire (which may contain the luminaire processing element and other components and modules described above), in a "blade" or a "micro blade" configuration. The luminaire will be operative without attaching the App Engine, and operative with enhanced (smart) capabilities when the App Engine module is attached, allowing it to run applications and perform the tasks described above.

In addition: a server running management software can:
- Allow management and programming of individual lighting elements/lamps, or groups of lamps, or of other lighting electrical grid elements (e.g. electrical cabinets); collect performance data, set alarms and notifications, produce performance reports and data, etc.,
- download SW upgrade, or a new complete application, to many streetlights, automatically scheduled according to the field deployment of the connectivity and of the processing elements capabilities, in an optimized way so that wireless communication congestion is avoided yet it is ensured and registered that each relevant lighting (it's processor or App Engine) was properly, or improperly loaded with it and running it, or retries, or marked as non-functional for that application or in general;
- Contain, manage, stamp, or otherwise impact "lighting-valid" certifications to applications, so that lighting processing elements can rely on this certification in order to allow such applications to run on them, access their data, etc.;
- In addition: A virtual representation of any planned or deployed systems
- Important especially when dealing with such mass deployments, even more so as the platform needs to be protected from failures, hackers etc; issues like downloading SW upgrade, or a new application, to many streetlights should be automatically scheduled in order to avoid wireless communication congestion yet ensure that each relevant lighting processing element was properly downloaded
- Management SW is Cloud-based, or running on local desktops etc
- Allowing certified users, including 3$^{rd}$ parties, to simulate functions like: the lighting grid or network, simulate power consumption, processing elements load, memories loads, lighting plans, patterns and schedules, longevity, maintenance, SW upgrades—scheduling planning management etc, connectivity, congestions and backhauls, application deployments, applications safety, applications functional or other impact in any of said parameters, connectivity offloading from other networks (such as muni-WiFi, commercial cellular etc.). Simulation of the said actions can result in graphic depiction of the performance of the relevant network elements or in reports, etc. and lead to performing, modifying or canceling the action.

In some embodiments, the streetlight App Engine (or by the street light processor) communicates and interacts with unmanned vehicles ("autonomous vehicles"), be they terrestial or aerial (ie "drones"). Communication is performed via any wireless protocol. The streetlight processor can include means to interract with drones for: power, connectivity, sensory information, "docking station" or "resting area" or parking area or drone taxi dispatch station etc. (as shown in FIG. 6).

For example, the streetlight may include power supply circuitry, power supply socket which is weather resistant (water, rain, humidity, temperature, dust etc.), power supply induction surface which is also weather resistant, mechanical or electro-mechanical locking device controlled by software, for the drone. A drone may communicate with said processor, directly or via the central management unit or via another streetlight processor in that mesh network, authorized, and given a permission to land on that streetlight. It may then be guided to such landing via GPS/GNSS or other accurate or semi-accurate satellite navigation system, and then tuned the navigation and landing via low cost mechanisms such as RFID or WiFi beacon, image processing by the drone camera or similar sensor of a known or coordinate marking on the top or side part of the streetlight (such as a clearly marked symbol, sometimes in specific colors or patterns, or a mark that changes according to synchronized communication and shown via LED or similar lighting patterns, etc.).

As shown in FIG. 6, the drone lands on the streetlight. An electro-mechanical mechanism include a sensor to sense the successful landing. Such sensor may include a pressure sensor, proximity sensor, piezo-electrical sensor, a camera or similar electro-radiated sensor, a close/open circuit sensor, magnetic sensor, induction sensor, etc., or several of them combined. Then the locking mechanism 166 (FIG. 6) is activated by the streetlight processor to lock the drone onto the streetlight platform. For example, the drone may contain a small electro-magnetic that shall turn active when landing via induction power from the roof of the street light, shall turn into a magnet which shall be pulled by another magnet turning active in the streetlight so that the drone is dragged or pulled by magnetic force or another electro mechanical component to the proper designated spot on the streetlight roof and locked into place via this magnetic power. Any such locking mechanism shall ensure the drone shall not fall, even when severe weather arrives such as strong winds, wind gusts, etc. Lighting protection may also be applied via this mechanical/physical connectivity using grounding via the streetlight pole and/or the streetlight grounding mechanism. The drone may contain a power supply charging plug or similar mechanism, for example in its landing rods or landing gear or in its body that shall connect to a power supply connector plug on the streetlight. The streetlight may then charge the battery of the drone. Charging may also be done via other methods, such as an induction plate similar in principal to that of induction ovens, installed on the roof, or being the roof, of the streetlight. This induction, when the drone has the matching magnet plate attached, may charge the drone battery.

The streetlight processor may allow connectivity for that drone, such as backhauling traffic from it via its own connectivity, so that the drones may carry simpler communication devices, or not use them when in landing, or get better connectivity when flying in urban areas where their own connectivity mechanisms may be limited or offer limited capacity or output.

When the drone is locked or parks on the streetlight as described herein, it may go into a standby mode. In this mode the streetlight processor may overtake any specific or all processing missions that the drone processor normally performs. For example, the streetlight processor may inform, or confirm to, the drone air traffic control or operator or other management system that this drone has landed and is in standby mode. It may continuously or periodically inform that system about the drone status, such as battery charging level, and also about other parameters of interest such as environmental—wind, rain, temperature, etc. When that remote system requires the drone to go back into service it may do so via the streetlight processor, that may "wake up" the drone by means of electrical signal on the connector or other means such as peeping window communication over the short range with the streetlight, which is much more power-efficient and reliable communication that from the drone to its remote management system, which at times might not even be possible.

In some embodiments of the invention the streetlight, independently or in communication with other streetlights, or with other relevant entities installed in the vicinity, or with the central management or other cloud-based or remote entities, may assist or conduct or manage air-traffic control for such drone or multiplicity of drones. It may carry sensors that identify the drone, or identify it via communication. It may carry or include means to identify its movement in the air such as using small radars or LIDARs etc, or to simply notify other air-traffic control entities of the current existence of the drone in its vicinity or its air-traffic controlled area. Or, it may transmit beacons or other communications that allow the drones to navigate accordingly. The drone may even perform triangulation calculations of several beacons arriving from several streetlights or streetlight and other beacon sources. The drone may then use the identified streetlights to move in pre-programmed lanes or paths or directions or routes in the air, know when to turn without the need to perform complex geo-spatial or similar computations etc, reducing the requirements from its processing capabilities, power supply etc.

The streetlight processor that performs this air-traffic control (or the number of them working together in synch and exchanging information, and/or the remote management system that performs this task with cooperation and synch or distributed with the streetlight processor), may select routes for the drones based on various parameters that may be known to the streetlight processors and management only, and that improve route selection, or even enable it to be optimized to certain target functions. For example, it may consider human density, distribution and location below the various possible drone routes from point A to B as measured by the sensors connected to the streetlight processors network or placed on them. It may then select the route that passes above areas with fewer, or more pedestrians or crowd gathering, or time it so that for example it goes over a cross road areas where people at rush hour may crowd for a traffic light to change to green to the moment when it changes to green and the people are no longer waiting—for a very precise period/duration/interval. It may also consider environmental conditions as measured by the other sensors connected to the network of streetlights or placed on them, for example wind (strength, directions, gusts etc), heavy rain, lighting etc. It may then select the route that best utilize wind directions and/or gusts. This is especially important in urban environment where high-rise buildings and other architecture structures may result in "wind tunnels" etc, and this may vary over short and longer time periods, such as time of day, seasons, etc. The processor may prioritize some droned over others, such as according to the drone parameters (e.g., dimensions, weight, etc.), their operators (for example commercial vs public safety or police), missions (such as emergency vs lower-delay), service level agreements and commercial terms (such as high-paying vs low-paying or others).

These mechanisms in the invention, each one of them and all of them together, shall greatly increase the usability of drones to be operated in an independent unmanned way, prolonged over time, automated, lower operation cost, increase human and environment safety, and increase the type of missions and volume of air-traffic possible by drones in urban or otherwise dense areas. The invention allows drones to fly or be operated longer without the need to return to a base, to replace batteries, to fly low and land on surfaces that are at dangerous human proximity hence so overall danger from drones to humans and property is decreased. The drones can land on any allowed/authorized streetlight, decreasing their "air mileage" overhead and wasted time which are due to the current need to fly back to their operator, to depend on such operator or limited designated locations for charging—a limitation which also decreases safety and increases density in such designated locations, if such exist, such as designated air-fields/strips for multiple drones. Instead, any streetlight may turn into a temporary or even emergency landing spot, with or without power charging the drone, allow connectivity with it, coordinate the air-traffic control of many such drones etc.

In some embodiments of the invention drones provide connectivity to streetlights not having such backhaul connectivity. Such a configuration thus provides a relay or ad-hoc network connection to the streetlight processor via its wireless communication module. The drones can "carry" software, which is downloaded download to a streetlight when the drone approaches a streetlight and/or upon landing thereon, for streetlights that are normally, or accidentally, not connected to the backhaul internet or cloud. In this way, a visiting drone provides network connectivity to streetlights that don't have, or don't need constant continuous connectivity. A visiting drone can thus provide regular or random connectivity to streetlights that collect metering or other data and telemetry collected over time by such streetlights processors from their own sensors and processor(s) or from proximal sensors/processors, such as, but not limited to: home power and water meters. Drones can land on the streetlight and physically connect with it, or drones communicate with the streetlight wirelessly such as over WiFi— as shown in the figures.

In embodiments of the current invention, the streetlight provides lighting to drones, such as when a drone or remote control management requests to light an area for an array of drone missions, such as but not limited to: search and rescue; inspection (such as power-line inspection or ground traffic management, or window or other infrastructure inspection), and photography (e.g. cinematography, cartography). The drone or management entity communicates with the streetlight processor and instructs it where to direct the lighting, at what volume/power, color, and other patterns, timing, duration, etc. The drone and/or management entity performs calculation to ensure that the safety streetlight is not impacted, meaning: lighting for traffic and/or pedestrians is continuously and sufficiently provided at the desired time. Lighting for such drone's missions may be coordinated and provided by multiple streetlights, respectively calculating the right lighting portion, or beam, at the right time and to the right location and angle as calculated by respective street lights and/or by the central management entity.

In other embodiments of this invention the streetlight pole may be equipped with means, mechanical, electrical and software, to allow a drone to deposit a package, to lower it to the ground by means such as external or pole-internal elevating device, to lock the package so that only authorized person may gain access to it, to receive an authorized package from an authorized person by acting as an automated post-office, to elevate this package up for the drone to pick it up from the streetlight, to communicate the status of such process with remote management systems and receive relevant communications and instructions from it, etc.

It will be appreciated that the above descriptions are intended only to serve as examples, and that many other embodiments are possible within the scope of the present invention as defined in the appended claims.

The invention claimed is:

1. An outdoor lighting system for illumination of an outdoor area, the system comprising:
   a remote digital distribution platform to provide access to a plurality of downloadable software applications;
   a plurality of luminaire devices configured in the outdoor area, wherein each of one or more of the plurality of luminaire devices comprises:
   one or more lamps,
   a controller configured to control the one or more lamps according to system parameters, and
   a processor configured to:
   download, from the remote digital distribution platform, a software application of the plurality of downloadable software applications,
   at least one of:
      (i) run the downloaded software application to at least one of modify, upgrade or command the controller of the luminaire device without further proxying or involving the remote digital distribution platform,
      (ii) run the downloaded software application and cause the controller to control the one or more lamps according to the downloaded software application in concert with the one or more other luminaire devices, wherein the controlling is without proxying or involving the remote digital distribution platform; and
      (iii) run the downloaded software application and cause the controller to control the one or more other luminaire devices according to the downloaded software application in concert with the controller of respective luminaire device, wherein the controlling is without proxying or involving the remote digital distribution platform; and
   at least one of hardware and software means configured to provide isolation of the processor of the respective luminaire device from the controller of the respective luminaire device to prevent the processor of the respective luminaire device from sending invalid commands to the controller of the respective luminaire device and to allow independent operation of the controller from the processor in case of processor malfunction or software error.

2. The system of claim 1, wherein the processor of each luminaire device of the plurality of luminaire devices is removably connectable to the respective luminaire device.

3. The system of claim 1,
   wherein a luminaire device of the plurality of luminaire devices comprises or connected to one or more sensors, and
   wherein the processor of the respective luminaire device is further configured to cause the controller of the respective luminaire device to control the one or more lamps of the respective luminaire device further according to sensor data from the one or more sensors.

4. The system of claim 1,
   wherein a luminaire device of the plurality of luminaire devices comprises or connected to one or more sensors configured to measure parameters indicative of lighting conditions in a predefined lightning area, and
   wherein the processor of the respective luminaire device is configured to cause the controller of the respective luminaire device to control the one or more lamps of the respective luminaire device according to the measured parameters.

5. The system of claim 4, wherein the one or more sensors are configured to measure the parameters with respect to a predefined markers within the predefined lightning area.

6. The system of claim 1,
   wherein a luminaire device of the plurality of luminaire devices comprises or connected to one or more sensors configured to generate sensor data, and
   wherein the processor of the respective luminaire device is configured to detect an event based on the sensor data and control the controller of the respective luminaire device according to the detected event.

7. The system of claim 1,
   wherein a luminaire device of the plurality of luminaire devices comprises or connected to one or more sensors, and
   wherein the processor of the respective luminaire device is configured to:
   download and run a first software application and a second software application,
   detect an event based on sensor data from the one or more sensors using the first downloaded software application,
   send data concerning the detected event to the second downloaded software application.

8. The system of claim 1,
   wherein a luminaire device of the plurality of luminaire devices comprises a connectivity module configured to connect to one or more external elements in a vicinity of the respective luminaire device, and
   wherein the processor of the respective luminaire device is further configured to cause the controller of the respective luminaire device to control the one or more lamps of the respective luminaire device further according to data received from the one or more external elements.

9. The system of claim 1, wherein a luminaire device of the plurality of luminaire devices comprises means for displaying an advertising content, and wherein the processor of the respective luminaire device is further configured to display the advertising content and to cause the controller of the respective luminaire device to control the one or more lamps of the respective luminaire device further based on the advertising content being displayed.

10. The system of claim 1, wherein the processor of a luminaire device of the plurality of luminaire devices is configured to cause the controller of the respective luminaire device to control the one or more lamps of the respective luminaire device in a coordinated manner with at least one another luminaire device of the plurality of luminaire devices.

11. The system of claim 1,
   wherein a first luminaire device of the plurality of luminaire devices comprises or connected to one or more sensors and a connectivity module to send sensor data from the one or more sensors to a second luminaire device of the plurality of luminaire devices,
wherein the second luminaire device comprises a connectivity module configured to receive the sensor data from the first luminaire device, and wherein the controller of the second luminaire device is configured to control the one or more lamps of the second luminaire device further according to the received sensor data.

12. The system of claim 1,
wherein each luminaire device of a subgroup of luminaire device of the plurality of luminaire devices comprises or connected to one or more sensors and a connectivity module to send sensor data from the one or more sensors to a main control and management subsystem, and
wherein the main control and management subsystem is configured to receive sensor data from the luminaire devices of the subgroup, fuse the received sensor data and control at least some luminaire devices of the plurality of luminaire devices according to the fused sensor data.

13. The system of claim 1, further comprising a main control and management subsystem in communication with the plurality of luminaire devices, the main control and management subsystem is configured to control downloading of software application by at least a portion of the plurality of luminaire devices in a controlled and synchronized manner.

14. The system of claim 1, wherein each luminaire device of the plurality of luminaire devices comprises:
a light-emitting diode (LED) array;
a LED driver circuit configured to drive the LED array; and wherein the controller of the respective luminaire device is configured to:
monitor input power parameters provided to the LED driver circuit,
monitor output power parameters from the LED array, and
control the LED driver circuit based on the input power parameters and the output power parameters to maintain over time a desired lighting level of a target area by the LED array according to at least one of preset operational parameters and external operational control commands received by the controller.

15. The system of claim 14,
wherein the LED array of each luminaire device of the plurality of luminaire devices comprises multiple channels, each channel for at least one LED of the LED array, and
wherein the LED driver circuit of the respective luminaire device is configured to drive each of the multiple channels of the LED array separately from other channels of the LED array of the respective luminaire device,
wherein the controller of the respective luminaire device is configured to control the LED driver circuit of the respective luminaire device to drive at least one of the multiple channels of the LED array of the respective luminaire device to compensate for a malfunction in at least one LED of the LED array of the respective luminaire device to maintain over time the desired lighting level of the target area by the LED array of the respective luminaire device.

16. The system of claim 1,
wherein a luminaire device of the plurality of luminaire devices comprises or connected to one or more sensors configured to detect a hazardous activity, and
wherein the processor of the respective luminaire device is configured to cause the controller of the respective luminaire device to control the one or more lamps of the respective luminaire device according to the detected hazardous activity.

17. The system of claim 1, wherein the processor of each luminaire device of the plurality of luminaire devices is configured to run an Operating System (OS).

18. The system of claim 1, wherein the downloaded software application receives or requests system parameters to coordinate the system parameters.

19. The system of claim 1, wherein the processors of at least a portion of luminaire devices of the plurality of luminaire devices are configured to run software applications that are different from the software applications running on the processors of other luminaire devices of the plurality of luminaire devices.

20. A luminaire device configured in the outdoor area, the luminaire device comprises:
one or more lamps,
a controller configured to control the one or more lamps according to system parameters,
a processor removably connectable to the luminaire device, the processor is configured to:
download, from a remote digital distribution platform, a software application of the plurality of downloadable software applications, and
at least one of:
(i) run the downloaded software application to at least one of modify, upgrade or command the controller of the luminaire device without further proxying or involving the remote digital distribution platform,
(ii) run the downloaded software application and cause the controller to control the one or more lamps according to the downloaded software application in concert with one or more other luminaires, wherein the controlling is without proxying or involving the remote digital distribution platform; and
(iii) run the downloaded software application and cause the controller to control the one or more other luminaire devices according to the downloaded software application in concert with the controller of respective luminaire device, wherein the controlling is without proxying or involving the remote digital distribution platform; and
at least one of hardware and software means configured to provide isolation of the processor from the controller to prevent the processor from sending invalid commands to the controller and to allow independent operation of the controller from the processor in case of processor malfunction or software error.

21. The luminaire device of claim 20, further comprising means for displaying an advertising content, and wherein the processor is further configured to display the advertising content and to cause the controller to control the one or more lamps further based on the advertising content being displayed.

22. The luminaire device of claim 20, further comprising or connected to one or more sensors configured to detect a hazardous activity, and wherein the processor is configured to cause the controller to control the one or more lamps of the respective luminaire device according to the detected hazardous activity.

* * * * *